Nov. 2, 1943.   H. DE W. RIDGE   2,333,492
SPOT LIGHT INDICATOR
Filed Oct. 26, 1940   2 Sheets-Sheet 1
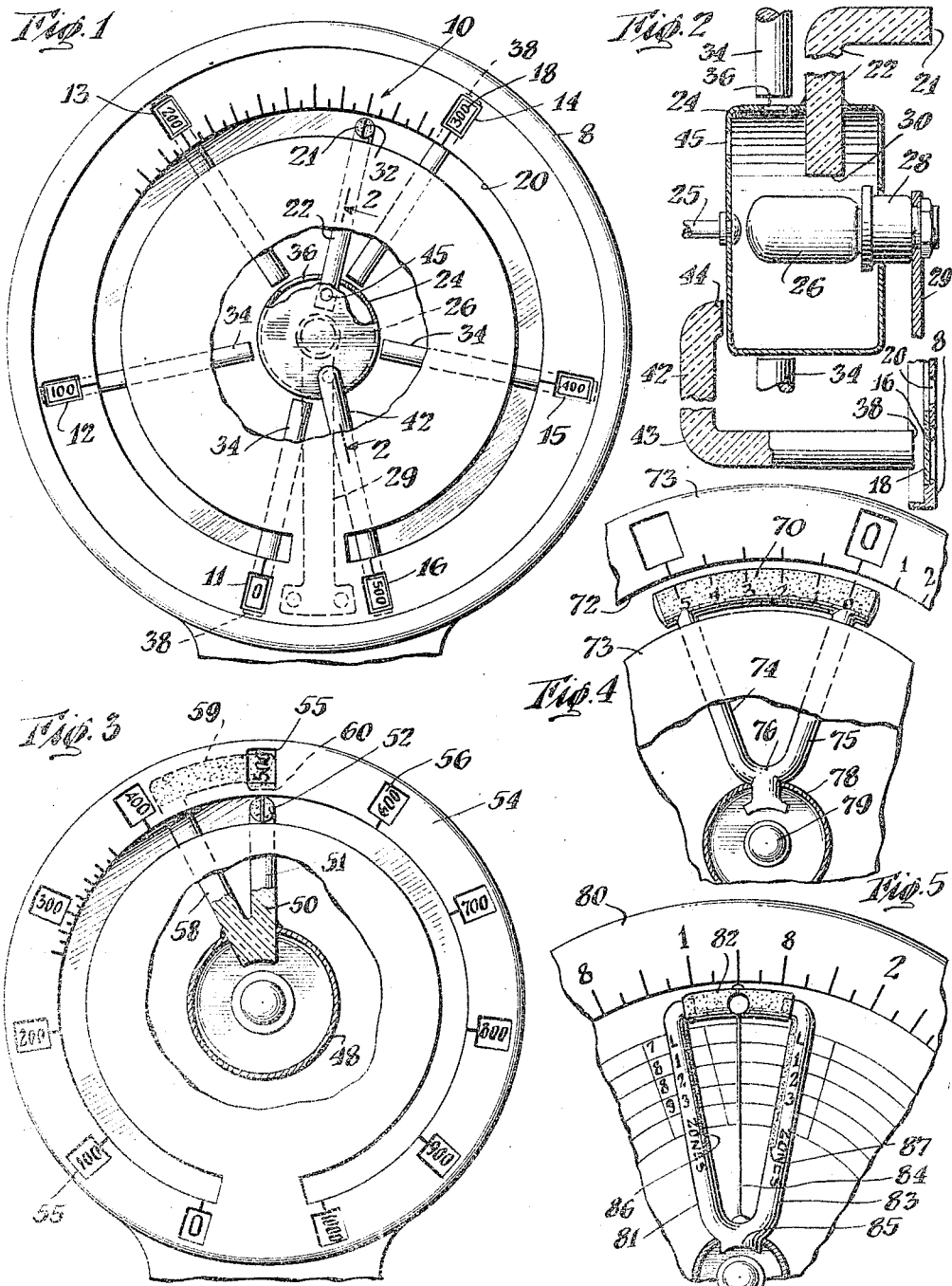
INVENTOR
Herman DeWitt Ridge
BY
his ATTORNEYS Nov. 2, 1943.    H. DE W. RIDGE    2,333,492
SPOT LIGHT INDICATOR
Filed Oct. 26, 1940    2 Sheets-Sheet 2
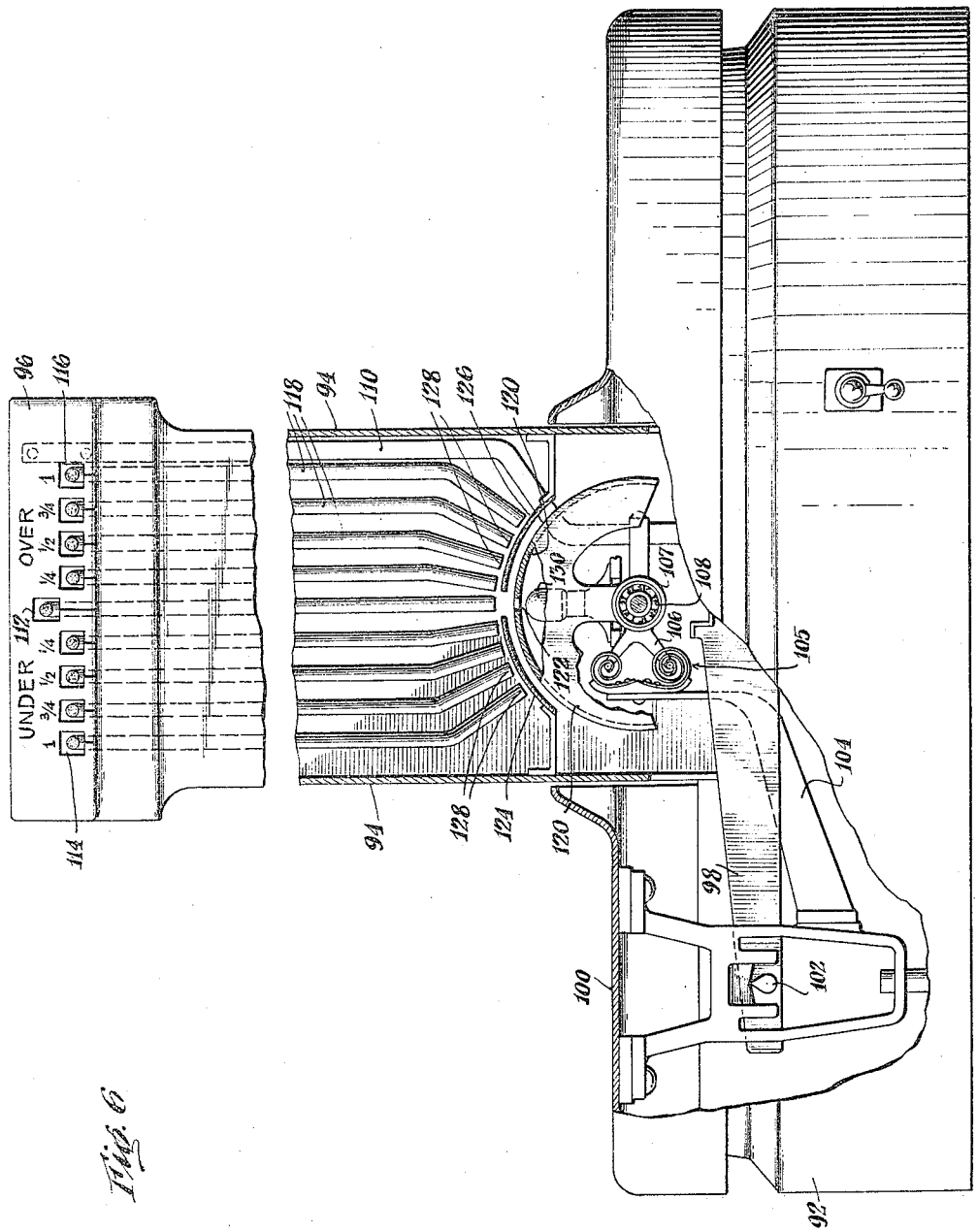
INVENTOR.
Herman DeWitt Ridge
BY
Hoguet, Neary & Campbell
ATTORNEYS Patented Nov. 2, 1943

2,333,492

UNITED STATES PATENT OFFICE 2,333,492

SPOTLIGHT INDICATOR

Herman De Witt Ridge, Mount Vernon, N. Y.

Application October 26, 1940, Serial No. 362,933

15 Claims. (Cl. 116—129)

This invention relates to scales and other condition indicating devices and more particularly to means for illuminating the indicator and/or dial of such devices to present spot illumination of the indicator and/or the index graduations of the dial.

Weight and condition indicating devices, such as scales, are often located in poorly lighted places where it is difficult to determine the proper dial readings. Attempts to overcome this difficulty have heretofore been made by illuminating the dial either by a lamp located in the housing of the scale or by means exterior of the scale. Such attempts, however, have usually resulted in producing objectionable glare and shadows over parts of the dial. Even where the sources of illumination are carefully arranged with the view of avoiding shadows, shadows nevertheless occur when the indicator moves between the light source and the dial, thereby rendering it difficult to take accurate readings.

Bearing in mind the difficulty of obtaining proper indicator and dial illumination by means heretofore proposed, one of the objects of my invention is to provide the indicator and/or the dial of scales and other condition indicating devices with improved illumination adapted to afford quick and accurate readings regardless of how poorly the devices may be located with respect to exterior sources of light.

Another object of the invention is to provide the dials of scales and other condition indicating devices with means operable to spotlight the proper dial reading.

Still another object of the invention is to provide a movable light emitting indicator, without the accompaniment of moving wires, electrical contacts or means tending to set up friction or reduce the sensitiveness of the device.

A further object of the invention is to provide means for successively illuminating particular index portions of a dial in conjunction with the movement of the indicator.

An additional object of the invention is to provide means for effecting a quick change in the color illumination of an indicator in accordance to the movement of the indicator.

The above and additional objects and features of the invention are obtained by providing a scale or other condition indicating device having a dial suitably graduated or otherwise marked, and associating therewith a light transmitting member movable relative to the dial and yet maintained in close association with a stationary source of light to indicate by spot illumination the position of the member and/or the proper reading of the graduations of the dial. The light transmitting member is carried or actuated by a moving part of the device with a portion of the member maintained in light receiving relation to a stationary light source while another portion of the member adapted to emit light is adapted to move adjacent the graduations of the dial. The light transmitting member may be lucite, quartz, specially prepared glass, or other suitable material capable of transmitting light through and along curved and irregularly shaped portions thereof. The portion of the member from which light emission is desired is preferably roughened or frosted to produce a soft glow.

My invention is applicable in many situations and to many types of scales and other condition indicating devices. By way of example I have, in one embodiment of the invention, applied the principles of my invention to a heavy duty scale of the type disclosed in my U. S. Patent No. 1,427,760. This is the type having means which, when the weight on the scale exceeds the limit of the graduations on the dial, is adapted to be adjusted to change the index of the graduations of the scale to a higher or greater weight. More specifically, a series of openings are provided in the dial adjacent the graduations and a movable member is disposed back of the dial so that figures or other indicia thereon may be selectively exposed for view through the openings of the dial. That is, when the weight on the scale exceeds the limit of the graduations, the member may be moved to change th exposed figures and thereby the index of the graduations for a greater weight indication.

In applying the principles of my invention to this type of scale, I not only provide a novel light emitting indicator, but I also provide a plurality of stationary light transmitting members associated with a housing enclosing a light source which is movable in conjunction with the indicator. Each stationary member is arranged to transmit light from the housing to illuminate one of the dial openings or windows. The construction and relation of the housing to these stationary members is such that as the indicator reaches a position adjacent a window, it permits passage of light to the member associated with the window, and maintains the window illuminated until the indicator has moved forward and reached a position adjacent the next succeeding window. In this way, a person viewing the dial can quickly and accurately determine the index of the graduations for the zone of the dial at which the indicator comes to rest.

Another example of the application of the principles of my invention is in the elimination of the plurality of stationary light transmitting members of a scale of the aforesaid type where the zones between adjacent windows are of smaller dimensions. In this form, the means for illuminating the windows include a light emitting portion extending substantially the width of a zone and movable from window to window in conjunction with the indicator.

Besides being applicable to various kinds and shapes of indicating devices, my invention is also readily adapted to quickly change the color of indicator illumination in accordance to movement of the indicator. This feature is especially adapted to scales of the type which indicates overweight or underweight should the pointer move away from a central or zero position. For example, the pointer in this type of scale is made of light transmitting material in accordance with my invention and associated with a stationary source of light. This provides for spotlight indication. To quickly indicate a departure from a balanced condition, suitable colored screens are provided between the light receiving portion of the pointer and the light source so that should the pointer move, for example, to indicate underweight, the light emitted from the pointer will change to one color, while if the pointer moves to an overweight position, light of another color is emitted.

If desired, the pointer of the overweight-underweight type of scales may be replaced by stationary light transmitting rods to successively illuminate a plurality of windows in the dial similarly as hereinbefore stated. The usual pointer actuating shaft or bearing would then carry a housing having a suitable aperture to permit passage of light successively to the light receiving ends of the stationary rods as the housing is moved. Suitable colored screens might also be placed between the housing and the rods to give color illumination for changes indicating overweight and underweight.

For a better understanding of the invention, reference is had to the following detailed description to be read in connection with the accompanying drawings, in which:

Fig. 1 is a view in front elevation of a dial with parts broken away to show one of the forms of my invention applied to a scale of the type disclosed in my aforesaid Patent No. 1,427,760;

Fig. 2 is a view in vertical section taken substantially along line 2—2 of Fig. 1;

Fig. 3 is a view in vertical elevation of a dial having graduated zones of smaller dimensions than the form shown in Fig. 1, showing another embodiment of my invention;

Fig. 4 is a fragmentary view of the dial of a "tare" indicator to which the principles of my invention have been applied;

Fig. 5 is a fragmentary view of a computing dial of the fan type which also incorporates the principles of my invention;

Fig. 6 is a view in vertical elevation of an overweight-underweight scale with parts broken away to show a further embodiment of my invention;

The invention as herein shown and described for purposes of illustration is applied in several forms to different types of weight indicating scales. Referring to the figures of the drawings, the several embodiments of the invention include generically a stationary source of light and a light transmitting member operatively associated with some moving part, such as the usual indicator shaft of the weighing device, to indicate by spot illumination the proper reading regardless of how poorly the device may be located with respect to exterior sources of light. In devices having dials of either the circular (Figs. 1 to 3) or the fan type (Figs. 4 and 5), the light source may be advantageously located coaxially of the indicator shaft to insure adequate illumination for the indicator and/or particular parts of the dial. In other shapes of dials, such as the overweight-underweight scales of Figs. 6 and 7, the source of light may advantageously be positioned outside of the axis of the indicator shaft. In each arrangement, however, the light receiving portion of the indicator is maintained in close proximity of the light source for transmission of light through the indicator for emission in such manner as to afford quick and accurate index readings.

Referring to Figs. 1 and 2 of the drawings, I have shown the present invention applied to the type of weight indicating scale disclosed in my aforesaid Patent No. 1,427,760. This type of scale is provided with a dial 8 having graduations 10 and a series of six circumferentially spaced openings or windows 11 to 16 therein arranged adjacent the graduations 10. As shown, the weight represented by each graduated zone between adjacent windows is equal to 100 units making a limit of 500 for the dial. Should the weight on the scale exceed the limit of the graduations, means (not herein shown for reasons of brevity) may be actuated to change the index of the graduations by shifting a second dial 18 to bring a different set of figures in view of the windows. For one advanced movement of the dial 18 from the position shown, the index graduation of the dial will be changed to read from 500 to 1000. For a second advanced movement of the dial 18, the graduations will read from 1000 to 1500, etc.

In adapting this type of scale for use with my invention I make the second dial 18 or at least those portions thereof having figures or other indicia thereon of transparent or at least translucent material so that the figures or other indicia may be illuminated from the back side thereof.

The dial 8 is provided with a circumferentially arranged slot 20 adjacent the graduations 10, through which the end portion 21 of an indicator 22 extends for movement adjacent the graduations 10. The indicator 22 is carried by a light housing 24 which is mounted upon an indicator shaft 25. A suitable lamp 26 is surrounded by the housing 24, the lamp being held stationary in a socket 28 supported by a bracket 29 mounted on the dial 8 or other suitable stationary part of the scale. The lamp 26, thus supported, is substantially coaxial with the axis of the indicator shaft 25 so that during movement of the indicator shaft the light receiving end 30 of the indicator 22 is maintained substantially the same distance from the lamp. The surface of the exposed end 21 of the indicator is shown as roughened or frosted and provided with an index line 32 which is illuminated by a soft glow of light emanating from the adjacent surfaces. This presents a spot illumination by which readings can be quickly and accurately taken.

The windows 11 to 15 are shown as individually illuminated by rods 34 of light transmitting material suitably mounted in stationary positions back of the dial 8. The light receiving ends of these rods are positioned closely adjacent the periphery of the housing 24 which contains a slot 36 through which light is permitted to pass. The slot 36 is so located with respect to the indicator 22 that as the indicator 22 comes adjacent a window, light is permitted to pass to a rod 34 associated with that particular window. Each rod 34 is turned at right angles or otherwise suitably shaped to provide a light emitting surface 38 back of one of the windows 11 to 15 in a similar manner as the end portion 43 of rod 42 shown in Fig. 2. Light transmitted through the rod 34 is thus emitted from the surface 38 to illuminate the figures of the dial 18 viewable through these windows.

The rod 42 which illuminates the window 16 is so shaped as to position the light receiving end 44 adjacent one side of the housing 24 which is provided with an opening 45 in alignment with the position of the indicator 22 (Fig. 2). The purpose for this is to provide for the illumination of the window 16 only while the indicator 22 is directly adjacent the window 16. This arrangement of the rod 42 also avoids illumination of the window 16 when the indicator 22 is in initial position adjacent the window 11.

During weighing operations of the scale shown in Figs. 1 and 2, the indicator 22 is adapted to move in accordance to the weight of any object placed upon the scale to indicate by spot illumination the weight thereof. Since the indicator is originally positioned at a zero reading adjacent the window 11, the window 11 will be illuminated until the indicator reaches the next succeeding window 12. As the indicator reaches the window 12, the passage of light to the window 11 is cut off and light is permitted to pass to the window 12 through the rod 34 associated therewith. Likewise, when the indicator reaches the window 13, the slot 36 will have passed beyond the end of the rod associated with window 12, thereby cutting off the passage of the light to the window 12 and permitting light to pass through the rod associated with the window 13. Should the indicator come to rest in the position shown, the window 13 only will be illuminated, thereby rendering it easy to ascertain the proper reading which in this instance would be 270.

Should the indicator 22 pass to the end of the slot 20 past the window 16, a weight in excess of the limit of the present graduations of the scale would be indicated. By shifting the second dial 18 to present an index reading of 500 to 1000, the indicator 22 will then return to the proper position on the dial should the weight on the scale be between 500 and 1000. It will thus be seen that as the indicator passes into each zone of the dial, the proper index number for that zone is illuminated so that accurate readings are insured.

Referring to Fig. 3 of the drawings, I have shown a further embodiment of my invention applied to a scale having a dial with openings at shorter distances apart than those of the dial shown in Fig. 1. In this embodiment a housing 48 is provided with a triangular shaped light transmitting member 50 which eliminates the need of the stationary rods 34 of the previous embodiment. A leg 51 of the member is provided with a spot indicator 52 similar to the end portion 21 of Fig. 1 adapted for movement adjacent the graduations of the dial 54. Adjacent the graduations of the dial 54 is a series of circumferentially arranged openings or windows 55 back of which a second transparent or translucent dial 56 is provided. A leg 58 of the member 50 extends to a position underlying the dial 56. This leg carries the third leg 59 which is slightly curved and arranged for movement lengthwise thereof back of the windows 55. The surface of the leg 59 is suitably roughened or frosted to permit emission of light to illuminate whichever window the leg passes. Thus, as the indicator 52 reaches a position adjacent a window, the light emitted from the leg 59 will illuminate the figure viewable through that window. This illumination of the window continues until the indicator 52 returns past the window or until it reaches the next succeeding window similarly as in the case of the form shown in Figs. 1 and 2.

The leg 59 of the member 50 may also be provided with a portion 60 turned toward and in alignment with the leg 51 to illuminate the outermost surface of the indicator 52. Where this additional illumination of the indicator 52 is not desired, the legs 51 and 59 may be joined. In fact, the member 50 may take various shapes. If desired, the leg 51 may be omitted by extending and so shaping the portion 60 as to present a light emitting indicator viewable along the graduations of the dial 54.

Another form of indicator constructed in accordance with my invention is shown in Fig. 4. This indicator is also of triangular shape having an indicator leg 70 arcuate in shape for movement lengthwise in the slot 72 of the dial 73. The leg 70 is supported by legs 74 and 75 which are joined at 76 to provide a light receiving end extending through and carried by a light housing 78. The leg 70 is frosted and graduated as a "tare" indicator. The leg 70 is illuminated by light transmitted through the legs 74 and 75 from a lamp 79.

Still another form of indicator embodying the principles of my invention is shown in Fig. 5. This indicator is associated with a computing scale having a dial 80 of the fan type provided with appropriate graduations and zones characteristic of the computing scales. The indicator shown comprises three legs 81, 82 and 83. Disposed between the legs 81 and 83 is a hairline 84 by which readings are determined. The light received through the light receiving portion 85 of the indicator is transmitted lengthwise of the legs 81 and 83. The opposed surfaces of the legs 81 and 83 are roughened at 86 and 87 to permit the emission of light toward the hairline 84. The leg 82 may also be roughened to emit light which together with the light emitted from portions 86 and 87 provides adequate illumination for the hairline 84 and the graduations contained on the dial 80.

To facilitate computations, the legs 81 and 83 may also be provided with figures to indicate different zones corresponding to the graduations contained on the dial.

While I have shown the indicator in Fig. 5 to comprise two legs 81 and 83, it will be readily observed that one leg may for certain usage be eliminated and the leg 82 may terminate adjacent the hairline 84.

Referring to Fig. 6 of the drawings, a further embodiment of the invention is shown as applied to an overweight-underweight scale of the type disclosed in my U. S. Patent No. 2,124,357. The scale comprises a base 92 supporting a tower 94 provided with a dial 96. A lever 98 is pivotally supported on centrally located knife edges or other suitable bearings (not shown) and provided with platters 100 suitably mounted thereon at 102 for receiving weights and articles to be weighed. Relative movement of the platters 100 is transmitted through an arm 104 and resisting means 105 which is operatively connected to a bracket 106. The bracket 106 is supported for oscillatory movement by a sleeve 107 mounted on and defining the ball race of a roller bearing 108 supported on a stationary part 110 of the scale. The dial 96 is provided with a central window 112 at the center line or zero position of the dial and a series of windows 114 adjacent the underweight graduations and another series of windows 116 adjacent the overweight graduations.

A plurality of light transmitting rods 118 are mounted within the tower, one for each of the aforementioned windows, and arranged to transmit light to illuminate the windows similarly as in the form of my invention illustrated in Figs. 1 and 2. A semi-cylindrical housing 120 is carried by the sleeve 107 and provided with a suitable aperture 122 arranged to permit passage of light sufficiently to illuminate any one of the rods brought into registry therewith. To provide color illumination to indicate change from a balanced or zero position, I have shown a pair of stationary screens 124 and 126 disposed adjacent the housing 120 and across the light receiving ends 128 of those rods which are associated with the windows 114 and 116.

In operation, a balanced position is indicated by light transmitted from the light source 130 through the aperture 122 and associated rod 118 to the center window 112. Should an underweight or overweight occur, the housing 120 will be moved correspondingly to permit passage of light to the proper rod 118 and therethrough to the proper window of the windows 114 or 116, as the case may be. The colored screens 124 and 126 intercept the light passing from the aperture 122 to provide a color illumination of the under and overweight windows, thereby rendering it quickly apparent when an unbalanced position occurs.

In each of the illustrated embodiments of my invention, I have shown a movable light emitting member which is free of hanging wires, contacts, and other friction connections. By my invention, I have therefore provided spot illumination for indicator and dial readings of sensitive devices, such as scales and the like, without altering the sensitivity thereof.

While I have shown and described several different embodiments of my invention, it will be readily apparent that many additional modifications and adaptations for use with other apparatus are possible without departing from the spirit of my invention. It will therefore be understood that the forms of the invention herein illustrated and described are intended to be illustrative only and not as limiting the scope thereof.

I claim:

1. In a device having a movable element and a stationary dial having graduations, a series of openings therein adjacent said graduations and figures viewable through said openings; the combination of a stationary source of light, a light transmitting member movable with said element, a portion of the member being maintained in light receiving relation to said light source while a light emitting portion thereof is movable adjacent said graduations, and means for transmitting light from said light source to selectively illuminate the figures viewable through said openings.

2. In a device having a movable weight sensitive element and a stationary dial having graduations, a series of openings therein adjacent said graduations and figures viewable through said openings; the combination of a stationary source of light, a light transmitting indicator carried by said movable element with a portion of the indicator maintained in light receiving relation to said light source while a light emitting portion thereof is movable adjacent said graduations, and means operable as said indicator reaches a position adjacent one of said openings to illuminate the figures viewable through such opening.

3. In a device having a movable element and a stationary dial having zones of graduations, a series of openings therein, one for each zone, and figures viewable through said openings; the combination of a stationary source of light, a light transmitting indicator carried by said movable element with a portion of the indicator maintained in light receiving relation to said light source while a light emitting portion thereof is movable adjacent said graduations, and means including a housing associated with said light source operable as said indicator moves into one of said zones to illuminate and maintain the opening of that zone illuminated until the indicator moves out of that zone.

4. In a device having a movable element and a stationary dial having graduations, a series of openings therein adjacent said graduations and figures viewable through said openings; the combination of a stationary source of light, a housing for said source of light carried by said element, an indicator operated in conjunction with said element, and means associated with said housing operable as said indicator reaches a position adjacent one of said openings to illuminate the figures viewable through such opening.

5. In a device having a movable element and a stationary dial having graduations, a series of openings therein adjacent said graduations and figures viewable through said openings; the combination of a stationary source of light, a housing for said source of light carried by said element, an indicator operated in conjunction with said element, and means including a light transmitting member associated with said housing and operable as said indicator reaches a position adjacent one of said openings to illuminate the figures viewable through such opening.

6. In a device having a movable element and a stationary dial; the combination of a stationary source of light, a housing for said light source and carried by said element, a plurality of stationary light transmitting members, each of said members being disposed with a portion thereof adjacent said housing and a light emitting portion adjacent said dial, and said housing having means to permit passage of light to said members successively as said housing is moved relative to said members.

7. In a device having a movable element and a stationary dial having graduations, a series of openings therein adjacent said graduations and figures viewable through said openings; the combination of a stationary source of light, a housing for said light source and movable by said element, a light transmitting member having a portion extending into said housing, another portion roughened to provide an illuminated indicator movable adjacent said graduations and a third portion roughened and adapted to span substantially the space between succeeding openings so that light emitted therefrom is operable, as the indicator reaches a position adjacent an opening, to illuminate the opening and maintain it illuminated until the indicator reaches the next succeeding opening.

8. In a device having a movable element and a stationary dial having graduations, a series of openings therein adjacent said graduations and figures viewable through said openings; the combination of a stationary source of light, a housing for said light source and movable by said element, an indicator operated in conjunction with said element, a light transmitting member carried by said housing in light receiving relation to said light source, a portion of said member being arranged to illuminate each of said openings as said indicator moves adjacent thereto, and another portion of said member being disposed adjacent the indicator to maintain the same illuminated.

9. In a device having a movable element and a dial; the combination of a stationary source of light, a housing for said light source carried by said element, a plurality of stationary light transmitting members, each of said members being disposed with a portion thereof adjacent said housing and a light emitting portion adjacent a portion of said dial, a colored screen disposed between at least one of said members and said housing, and said housing having means to permit passage of light to said members successively as said housing is moved relative to said members.

10. In a scale having a movable weight sensitive element and a stationary dial, the combination of a housing carried by said movable element, a stationary lamp disposed in said housing, said housing having an opening, a light transmitting member mounted for movement with said housing and having a portion thereof exposed through said opening in light receiving relation to said lamp, said member having a part extending across said dial, means to support a hairline spaced from and for movement with said part, and said part having a light emitting portion to emit light adjacent the hairline.

11. In a scale having a movable weight sensitive element and a stationary dial, the combination of a stationary lamp, a housing substantially enclosing said lamp and movable with said element, said housing having an opening in a wall thereof, a light transmitting member mounted for movement with said movable element and having a portion thereof exposed through said opening in light receiving relation to said lamp, said member comprising two legs extending across said dial and means interconnecting the outer ends thereof, a hairline indicator disposed between and movable with said legs by which readings may be determined, and said legs having opposed light emitting portions to emit light toward said hairline indicator.

12. In a scale having a movable weight sensitive element and a stationary dial, the combination of a stationary lamp, a housing substantially enclosing said lamp and movable with said element, said housing having an opening in a wall thereof, a light transmitting member mounted for movement with said movable element and having a portion thereof exposed through said opening in light receiving relation to said lamp during movement of the member, said member carrying a hairline indicator for visual association with said dial, and said member having a light emitting portion adjacent said hairline indicator and so disposed as to emit light toward said hairline indicator.

13. In a device having a movable element and a stationary dial provided with graduations and having a series of openings therein adjacent said graduations, means carrying numerical indicia disposed in position to be viewed through said openings, and a source of light; in combination, a light transmitting indicating member movable in response to movement of said element, said member having a portion in light-receiving relation to said light source and a light-emitting portion remote from said light source and movable adjacent said graduations, a plurality of stationary light-transmitting members, each disposed with a light-receiving portion adjacent said light source and a light-emitting portion adjacent one of said openings in said dial, and means operable as said indicating member reaches a position adjacent one of said openings to expose the light-receiving portion of the stationary light-transmitting member associated therewith to light from said light source and operable to conceal said light-receiving portion after said indicating member has moved away from said opening.

14. In a device having a movable element and a stationary dial provided with graduations and having a series of openings therein adjacent said graduations; the combination of a light source, a housing for said light source movable with said element, a plurality of stationary light transmitting members, each disposed with a portion adjacent said housing and a light-emitting portion adjacent one of said dial openings, and said housing having means to permit passage of light to said members successively as the housing is moved relative to said members.

15. In a device having a movable element and a light source; the combination of a housing for said light source movable in response to movement of said element, a stationary light-transmitting member disposed with a light-receiving portion adjacent said housing and a light-emitting portion disposed remotely therefrom, and said housing having restricted openings therein disposed to be brought into registry with said light-receiving portion of said member when the housing has been moved in response to movement of said element.

HERMAN DE WITT RIDGE.